June 27, 1933. W. S. DIEHL 1,915,298
SLOTTED RING COWLING FOR AIR COOLED ENGINES
Filed Jan. 9, 1931 2 Sheets-Sheet 1

INVENTOR
WALTER S. DIEHL
BY
ATTORNEY.

June 27, 1933. W. S. DIEHL 1,915,298
SLOTTED RING COWLING FOR AIR COOLED ENGINES
Filed Jan. 9, 1931 2 Sheets-Sheet 2

INVENTOR
WALTER S. DIEHL
BY Robert A. Lavender
ATTORNEY.

Patented June 27, 1933

1,915,298

UNITED STATES PATENT OFFICE

WALTER S. DIEHL, OF THE UNITED STATES NAVY

SLOTTED RING COWLING FOR AIR COOLED ENGINES

Application filed January 9, 1931. Serial No. 507,740.

(GRANTED UNDER THE ACT OF MARCH 3, 1883, AS AMENDED APRIL 30, 1928; 370 O. G. 757)

My invention relates broadly to an improvement in ring cowling for air cooled engines and more particularly to slotted ring members positioned around and attached to an air cooled engine mounted in an aircraft.

An object of my invention is to provide a ring type cowling for air cooled engines of an aircraft wherein the ring can be set at such an angle as to give a large forward component of the resultant air force on the ring without danger of the ring, acting as an air foil, operating in a stalled condition.

Another object of my invention is to construct a ring cowling having one or more slotted openings wherein the setting or adjustment of the parts forming the slots is made noncritical within a considerable range of the angle of attack.

A further object of my invention is to provide a cowling for an aircraft engine that is constructed of two or more rings held in mutually fixed relation to one another by struts or the like. The fixed positions of the rings are adjustable so that the gaps between the successive rings can be arranged in the most efficient position to form slots suitable for boundary layer control at angles of attack greater and beyond the angles normally used with conventional type cowling.

With the above and other objects in view, the invention consists in the construction, combination and arrangement of parts as will be described more fully hereinafter.

Reference is to be had to the accompanying drawings forming a part of the specification, in which like reference characters indicate corresponding parts throughout the several views, and in which Figure 1 is a side elevation of a portion of an aircraft showing a section of my improved device as secured to the engine;

Figure 1:
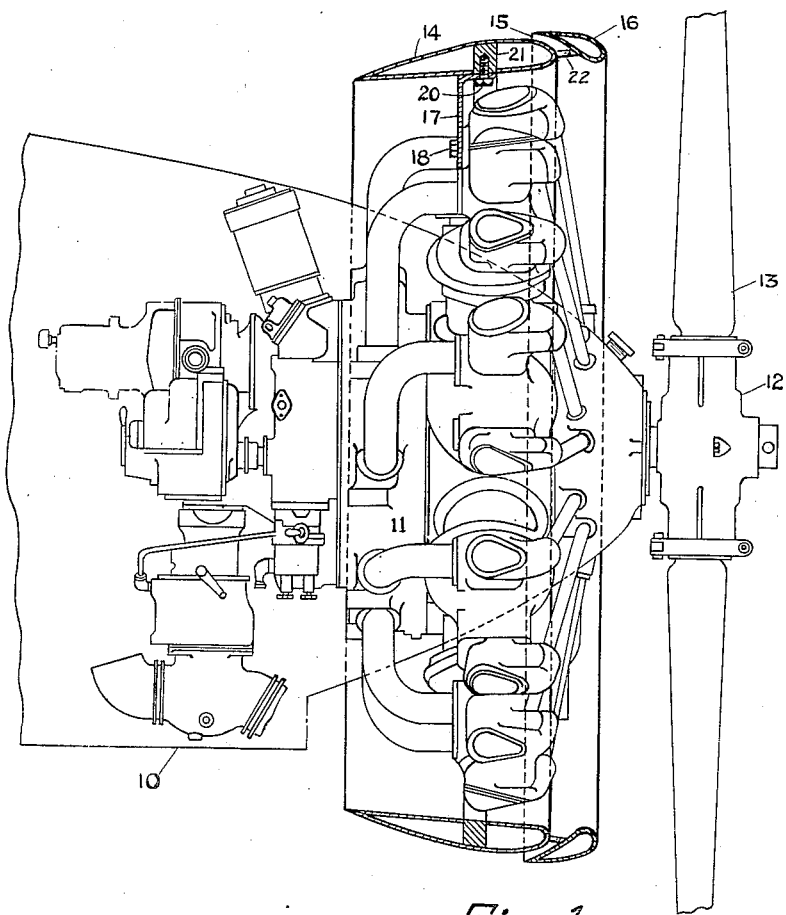

Ring cowls having air foil sections have been used primarily to direct the flow of air around the cylinders of air-cooled engines in such a manner that the resultant air force on the cowl itself has a forward or negative drag component for the cowl-engine-fuselage group. The setting with respect to the thrust line, or the angular adjustment of the air foil section forming the ring, is rather critical and varies with each airplane since the effective angle of attack of the air foil section with respect to the average local airflow direction must be as near as practicable to the angle of attack which gives maximum lift on this section. If the effective angle of attack of the ring section is greater than this, the efficiency of the ring cowl is much reduced. This is due to the fact that the ring is operating as an air foil in a stalled condition, that is, the angle of attack is so great that a turbulent flow is established on the outer side of the ring foil, thereby decreasing the negative drag. In order to reduce the critical nature of the angular setting and at the same time to provide a means for increasing the lifting force on the ring which produces the reduction of drag due to its inclination, I have designed a cowling made up of two or more annular rings having slots between each pair of rings. This cowl of rings gives a greater maximum lift and stalls at a greater angle of attack than does the conventional type cowling due to the effect of boundary layer control exercised by the jet of air issuing from the slot opening on the upper surface of the rings. I have also provided means of adjusting the slots between the rings to obtain the best results. Such adjustment is not very critical and is made once for all when the rings are properly assembled in place.

Referring more particularly to the drawings 10 indicates the fuselage of an aircraft having suitably mounted therein a conventional type air cooled engine 11 that drives a propeller hub 12 that has blades 13.

Placed around the engine 11 is my improved cowling which consists of a main or rear ring member 14, slot 15, and a forward ring member 16. The ring 14 is held in position by a number of brackets 17 that have one end secured by bolts 18 to the rear of cylinders 19 of the engine 11 and the opposite end fastened by bolts 20 to a support member 21 of the ring 14.

Suitably spaced around the forward or nose end of ring 14 are U shaped lugs 22 having slots 23, and partially positioned into the slots 23 are single lugs 24 that are correspondingly located and secured to the inner side of ring 16. The lugs 22 and 24 have elongated apertures 25 adjacent their ends and are clamped together by lock washers 26 and nuts 27 threaded onto bolts 28 that are inserted through the apertures 25. It will be noted that due to the elongated apertures 25, the forward ring 16 can be adjusted with respect to the main ring 14 so that the optimum location may be attained by trial and error for each specific type of aircraft.

Figure 3:
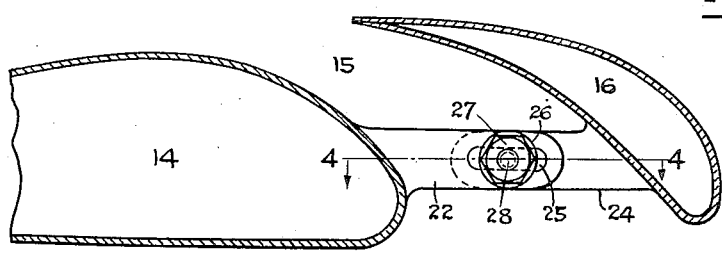
Figure 3 is a sectional view of a portion of my improved device.

I desire it to be understood that the ring members 14 and 16 are preferably of hollow construction following out the shape of cambered air foils and that the slot 15 is curved rearwardly from the under opening around the engine to the upper opening, as shown in Figures 1 and 3.

Figure 5:
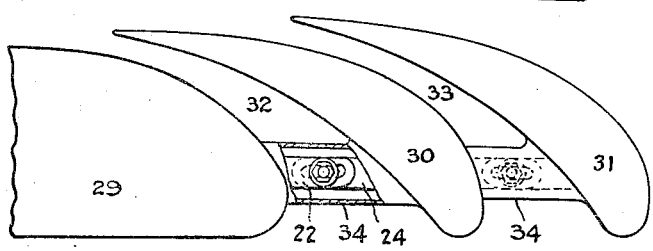
Figure 5 is a section of a modification of my improved device.
Figure 2:
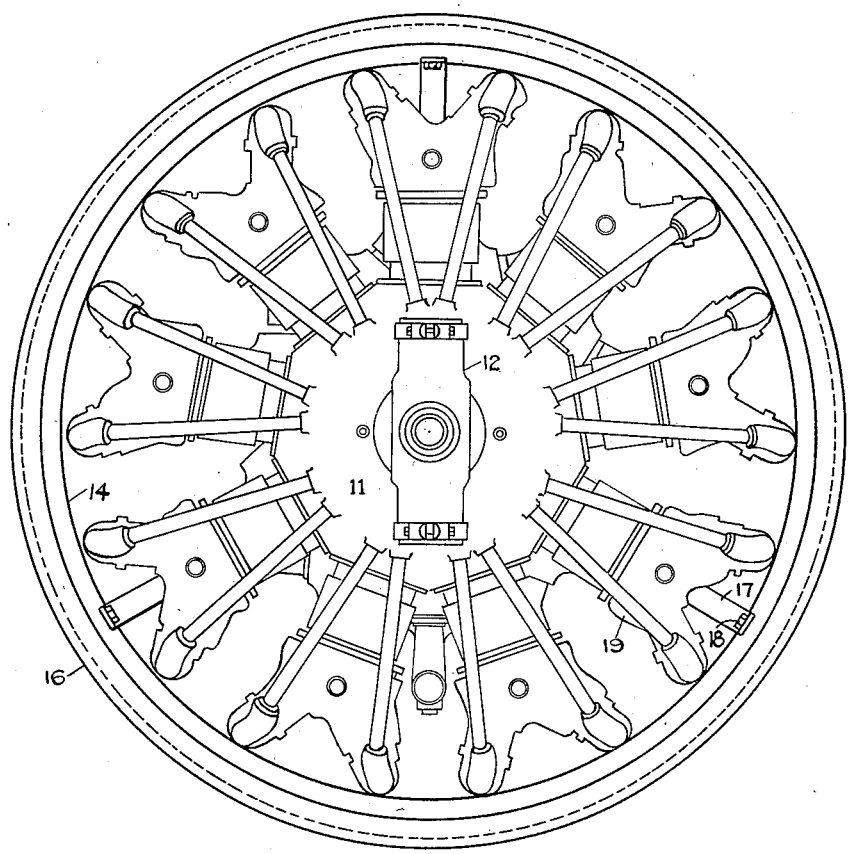
Figure 2 is a front elevation of an air cooled engine with my improved device secured thereto.
Figure 4:
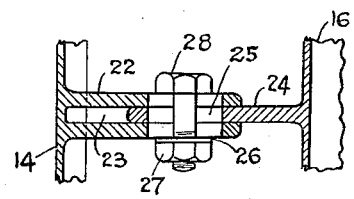
Figure 4 is a section on line 4—4 of Figure 3.

In Figure 5 I have shown a modification of my improved device which consists of a main or rear ring member 29, intermediate ring member 30 and forward ring member 31 having respectively the slots 32 and 33 therebetween. The linkages, not shown, securing ring 30 to ring 29 and ring 31 to ring 30 are housed in a strut shaped fairing 34. Although I have shown only one intermediate ring member 30, any number of said rings can be positioned between the rear member 29 and the forward member 31.

It will be understood that the above description and accompanying drawings comprehend only the general and preferred embodiment of my invention, and that various changes in construction, proportion and arrangement of parts may be made within the scope of the appended claims, and without sacrificing any of the advantages of my invention.

The herein described invention may be manufactured and used by or for the Government of the United States for governmental purposes without the payment to me of any royalties thereon.

What I claim is:

1. A cowling for an air cooled engine of an aircraft comprising an annular member, means positioning said member around the engine, an intermediate annular member, and a forward annular member, and adjustable means securing said intermediate member to said first mentioned annular member and said forward member to said intermediate member whereby slots, the sizes of which can be adjusted in accordance with the characteristics of the aircraft are formed between said members for boundary layer control.

2. A cowling for an air cooled engine of an aircraft comprising a ring member, means securing said member around the engine, one or more intermediate ring members, a forward ring member, adjustable means for securing said ring members together whereby slots are formed between said members suitable for boundary layer control, and fairing to house said adjustable means that secure the ring members together.

3. A cowling for an air-cooled engine of an aircraft comprising an annular airfoil, means positioning said airfoil around the engine, a second annular airfoil, means adjustably securing said second airfoil to the first airfoil whereby said second airfoil can be adjusted with regard to the first airfoil for effective operation in producing a slot capable of efficient boundary layer control, and fairing to house said adjustable means that secure the ring members together.

WALTER S. DIEHL.